– – –

3,248,399
PROCESS FOR PREPARATION OF 2-HYDROXY-ALKYL IMIDAZOLIDINONES
Wilhelm E. Walles, Midland, and Stanley S. Leff, Bay City, Mich., assignors to The Dow Chemical Company, Midland, Mich., a corporation of Delaware
No Drawing. Filed Apr. 25, 1963, Ser. No. 275,487
5 Claims. (Cl. 260—309.7)

This invention relates to processes for making 2-hydroxyalkyl imidazolidinones and to new compounds which can be thus made.

The reaction involved in the new process can be represented as follows:

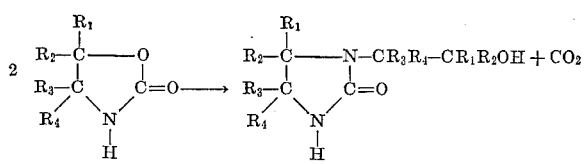

wherein each R is hydrogen or an alkyl radical, at least one being alkyl. The preferred materials are those oxazolidinones having not more than one alkyl radical in either the 4-position or the 5-position, i.e., at least one R in each of these positions is hydrogen. The most preferred materials are the 5-alkyl oxazolidinones, especially those wherein the alkyl radical contains up to about 8 carbon atoms.

As is evident from the above formulas, the substituents on the 2-hydroxyalkyl side-chain of the imidazolidinone are the same as those on the oxazolidinone used as starting material, those in the 4-position of the latter appearing in the 1-position on the side-chain of the former while those in the 5-position of the latter appear in the 2-position on the side chain of the former. Carbon dioxide is a by-product of the reaction.

The preferred oxazolidinones for use in the process of the invention are the 5-alkyl oxazolidinones, such as 5-methyl, 5-ethyl, 5-n-propyl, 5-isopropyl, 5-n-butyl, 5-sec.-butyl, 5-tert-butyl, 5-hexyl and 5-octyl oxazolidinones. Another desirable type is the 4,5-dialkyl oxazolidinones, such as 4,5-dimethyl, 4,5-diethyl, 4,5-dibutyl, 4-methyl-5-ethyl, 4-ethyl-5-propyl, 4-butyl-5-methyl and 4-hexyl-5-ethyl oxazolidinones. Also useful in practicing the invention are those oxazolidinones having 3 or 4 alkyl radicals in the 4 and 5 positions. The alkyl oxazolidinones may have inert substituents on one or more of the alkyl radicals without affecting the course of the reaction, and it is to be understood that the use of such substituted alkyl oxazolidinones to make the corresponding alkyl imidazolidinones is included in the present invention.

The process of the invention consists essentially of heating the oxazolidinone under an inert atmosphere at a temperature of about 225°–400° C. for a time sufficient to convert at least a useful proportion of the material to the corresponding imidazolidinone. The time required is inversely related to the temperature. Thus, at 310° C. about 3 hours are required to convert 10% of 5-methyl oxazolidinone while at 325° C. about 90–95% is converted within 5 hours.

The yield of imidazolidinone is improved if during the reaction period the volatile and gaseous byproducts, particularly $CO_2$, are continuously removed. This can be conveniently accomplished by operating under reduced pressure or by continuously purging the reactor with an inert gas, such as $N_2$.

The reaction may be conducted batchwise or continuously, though a continuous reactor would necessarily require a high capacity in order to provide the requisite long residence time.

The practice of the invention is illustrated by the following examples.

*Example 1*

A 3-liter reactor fitted with a stirrer and a reflux condenser was charged with 1600 g. of 5-methyl oxazolidinone, flushed with nitrogen, and then, while vented to the atmosphere, heated at 325° C. for 5 hours. The flask was then cooled, the pressure was reduced to 3 mm. and the product was distilled. About 11% of the 5-methyl oxazolidinone was recovered, after which the desired product, N-(2-hydroxypropyl)-4-methyl imidazolidinone, was distilled at 165° (1 mm.). Yield 29%.

The above product was a colorless, viscous liquid having the following:

|  | Calc'd | Found |
| --- | --- | --- |
| Molecular Weight | 158 | 160 |
| Percent C | 53.14 | 52.08 |
| Percent H | 8.90 | 9.20 |
| Percent N | 17.71 | 18.50 |

The structure was confirmed by infrared analysis.

*Example 2*

When the experiment of Example 1 was repeated except that a slow stream of nitrogen was passed continuously into the reactor during the reaction period, the yield of the imidazolidinone was 43% of the theoretical.

The novel hydroxyalkyl imidazolidinones of the invention are useful as chemical intermediates, particularly in the production of polymers and resins useful in finishing paper and textiles. Thus, they readily condense with formaldehyde to produce polymers useful for imparting crease-resistance to fabrics. Another use is in making esters useful as plasticizers for polyvinyl chloride and other synthetic resins.

We claim:
1. The process of making an imidazolidinone having the formula

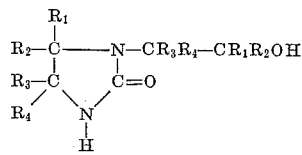

comprising heating under an inert atmosphere at about 225–400° C. an oxazolidinone having the formula

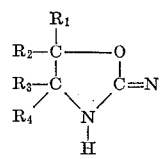

wherein, in each of the above formulas, $R_1$, $R_2$, $R_3$ and $R_4$ are radicals of 1–8 carbon atoms independently selected from the group of radicals consisting of H and alkyl radicals, at least one of them being alkyl.

2. The process of claim 1 wherein at least 2 of $R_1$, $R_2$, $R_3$ and $R_4$ are H.

3. The process of claim 1 wherein $R_2$, $R_3$ and $R_4$ are H and $R_1$ is an alkyl radical of 1 to 8 carbon atoms.

4. The process of making N-(2-hydroxypropyl)-5-methyl imidazolidinone comprising heating under an inert atmosphere 5-methyl oxazolidinone at about 225–400° C.

5. The process of claim 4 wherein the temperature is 310–325° C. and the heating is continued for 1–5 hours.

References Cited by the Examiner

UNITED STATES PATENTS

| | | | |
|---|---|---|---|
| 2,812,333 | 11/1957 | Steele | 260—309.7 |
| 2,887,485 | 5/1959 | Yost | 260—309.7 |
| 2,989,537 | 6/1961 | Druey et al. | 260—309.7 |

FOREIGN PATENTS

| | | |
|---|---|---|
| 483,160 | 5/1952 | Canada. |
| 697,839 | 9/1953 | Great Britain. |

OTHER REFERENCES

Gabriel et al.: Berichte, vol. 30, pages 2494–97 (1897).

IRVING MARCUS, *Primary Examiner.*

JOHN D. RANDOLPH, WALTER A. MODANCE, *Examiners.*